US011593360B2

(12) United States Patent
Burchard et al.

(10) Patent No.: US 11,593,360 B2
(45) Date of Patent: Feb. 28, 2023

(54) EMPIRICALLY PROVIDING DATA PRIVACY WITH REDUCED NOISE

(71) Applicant: Goldman Sachs & Co. LLC, New York, NY (US)

(72) Inventors: Paul Burchard, Jersey City, NJ (US); Anthony Daoud, New York, NY (US); Dominic Dotterrer, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 57 days.

(21) Appl. No.: 17/006,061

(22) Filed: Aug. 28, 2020

(65) Prior Publication Data

US 2021/0064610 A1 Mar. 4, 2021

Related U.S. Application Data

(60) Provisional application No. 62/968,742, filed on Jan. 31, 2020, provisional application No. 62/933,800, filed on Nov. 11, 2019, provisional application No. 62/913,089, filed on Oct. 9, 2019, provisional appli (Continued)

(51) Int. Cl.
*G06F 16/242* (2019.01)
*G06F 16/2457* (2019.01)
*G06F 16/2458* (2019.01)
*G06F 16/248* (2019.01)
(Continued)

(52) U.S. Cl.
CPC ........ *G06F 16/2425* (2019.01); *G06F 16/248* (2019.01); *G06F 16/2462* (2019.01);
(Continued)

(58) Field of Classification Search
None
See application file for complete search history.

(56) References Cited

U.S. PATENT DOCUMENTS

2019/0332703 A1* 10/2019 Feldman ........... G06F 16/24578
2020/0311540 A1* 10/2020 Chakraborty ....... G06F 21/6227
(Continued)

FOREIGN PATENT DOCUMENTS

EP 3244336 A1 11/2017

OTHER PUBLICATIONS

Mohammady et al., "Utility optimized differential privacy system", May 14, 2019 (Year: 2019).*

(Continued)

*Primary Examiner* — Dawaune A Conyers
(74) *Attorney, Agent, or Firm* — Fenwick & West LLP

(57) ABSTRACT

An empirical approach to providing differential privacy includes applying a common statistical query to a set of databases to produce sample values, both with and without any particular entity's data. The probability density is empirically estimated by sorting the sample values to generate an empirical cumulative distribution function. The cumulative distribution function is differenced across approximately the square root of the number of sample points to get an empirical density function. The statistical query is empirically ($\varepsilon,\delta$)-private if the empirical densities with and without any particular individual differ by a factor of no more than $\exp(\varepsilon)$, with the exception of a set for which the densities exceed that bound by a total of no more than $\delta$.

18 Claims, 5 Drawing Sheets

Related U.S. Application Data cation No. 62/905,657, filed on Sep. 25, 2019, provisional application No. 62/897,687, filed on Sep. 9, 2019, provisional application No. 62/893,376, filed on Aug. 29, 2019.

(51) Int. Cl.
*G06F 21/62* (2013.01)
*G06K 9/62* (2022.01)

(52) U.S. Cl.
CPC .... *G06F 16/24573* (2019.01); *G06F 21/6227* (2013.01); *G06K 9/6226* (2013.01)

(56) References Cited

U.S. PATENT DOCUMENTS

2020/0380159 A1* 12/2020 Lilly .................. G06F 21/6245
2021/0357523 A1* 11/2021 Nerurkar ............... G06F 16/248

OTHER PUBLICATIONS

Kamalika et al., "Differentially Private Empirical Risk Minimization", 2011 (Year: 2011).*
Dwork et al., The Algorithmic Foundations of Differential Privacy, 2014 (Year: 2014).*
Joy et al., "Differentially Privacy by Sampling", 2017 (Year: 2017).*
Bhaskar, R. et al., "Noiseless Database Privacy," Jun. 14, 2012, 26 pages, [Online] [Retrieved on Oct. 16, 2020], Retrieved from the Internet<URL:https://eprint.iacr.org/2011/487.pdf/>.
Dwork, C. et al., "The Algorithmic Foundations of Differential Privacy," Foundations and Trends® in Theoretical Computer Science, 2014, 281 pages, vol. 9, Nos. 3-4.
PCT International Search Report and Written Opinion, PCT Application No. PCT/IB2020/058078, dated Oct. 5, 2020, 14 pages.

* cited by examiner

EMPIRICALLY PROVIDING DATA PRIVACY WITH REDUCED NOISE

CROSS-REFERENCE TO RELATED APPLICATION

This application claims the benefit of U.S. Provisional Patent Application Ser. No. 62/893,376, filed Aug. 29, 2019, U.S. Provisional Patent Application Ser. No. 62/897,687, filed Sep. 9, 2019, U.S. Provisional Patent Application Ser. No. 62/905,657, filed Sep. 25, 2019, U.S. Provisional Patent Application Ser. No. 62/913,089, filed Oct. 9, 2019, U.S. Provisional Patent Application Ser. No. 62/933,800, filed Nov. 11, 2019, and U.S. Provisional Patent Application Ser. No. 62/968,742, filed Jan. 31, 2020, each of which is incorporated by reference.

TECHNICAL FIELD

The subject matter described relates generally to data analysis and, in particular, to an empirical differential privacy approach that reduces reliance on artificially added noise.

BACKGROUND

Differential privacy refers to a particular class of techniques for enabling statistical querying of a database without exposing information about individual rows. Many databases exist in which the individual rows correspond to entities (e.g., individuals, companies, or other legal persons). As such, these techniques are useful to preserve the privacy of individuals while obtaining utility from the data. Generally speaking, differential privacy approaches are designed such that fluctuations in the results returned by a query due to random or otherwise unpredictable factors are sufficient to obscure differences that arise from including or omitting a specific record. Thus, the data in a specific record cannot be determined by running the same query on the full dataset and the dataset with that record omitted.

Several existing differential privacy techniques start with a fixed database and add controlled noise to the answer before reporting the results of the statistical query. For example, the size of the noise can be taken to be the maximum difference between the query for the full data set and the query for the data set with one row removed, divided by a privacy budget. For multiple private queries on the same data set, privacy budgets are additive such that that the probability of any set of query results does not change multiplicatively by more than the privacy budget when individual rows are removed. However, it is often the case that the noise added to ensure sufficient privacy is very large, making the answer less useful as it also may obscure useful statistical information.

SUMMARY

Embodiments relates to a differential privacy approach that limits the amount of noise added to search results of aggregate queries. By limiting the amount of added noise, the approach maintains result accuracy while retaining the privacy of the individual entities represented in the data within acceptable bounds. Using the differential privacy approach, instead of posing multiple randomized queries against a single deterministic database, differential privacy may be implemented for a single deterministic query against a random database. If the rows are labeled by entity, this still gives a probability distribution of answers with and without the entity, and differential privacy can be enforced by requiring that the probability of any particular query result does not change multiplicatively by more than the privacy budget when the entity's data is removed.

In various embodiments, an empirical approach is adopted to provide differential privacy. The approach involves applying a common statistical query to a set of databases (e.g., a time series of databases). Assuming that the data included in each database is substantially independent of the others, the set represents an empirical sample from a hypothesized probability distribution of databases. The approach produces an empirical sample of values of the statistical query from the set of databases, both with and without any particular entity's data. How the empirical probability distribution of the answers differs with and without any entity's data provides an empirical measure of differential privacy.

In an embodiment of the differential privacy approach, a request is received to run a query on a set of databases that include data labeled by entity. The query is run on a subset of the databases by iteratively running the query with and without each entity's data to generate query results for the databases in the subset. Empirical probability density functions are calculated from the query results. It is determined whether the query meets one or more differential privacy requirements based on the empirical probability density functions. Responsive to determining that the query meets the one or more differential privacy requirements, a result of the query is outputted to one or more users via any appropriate interface. Additionally, or alternatively, a report may be generated based on the query results and presented to one or more users via any appropriate interface. Responsive to determining the query does not meet the one or more differential privacy requirements, noise may be added to the query results until the query results do meet the one or more differential privacy requirements. In this way, the amount of added noise is limited, and the accuracy of the query results is maintained.

DETAILED DESCRIPTION

Reference will now be made to several embodiments, examples of which are illustrated in the accompanying figures. Wherever practicable, similar or like reference numbers are used in the figures to indicate similar or like functionality. Although some of the embodiments described relate to generating market color reports from financial data, one of skill in the art will recognize that the disclosed techniques may be applied with other types of data and report.

Overview

Instead of posing multiple randomized queries against a single deterministic database, differential privacy may be implemented for a single deterministic query against a random database. If the rows are labeled by entity, this still gives a probability distribution of answers with and without the entity, and differential privacy can be enforced by requiring that the probability of any particular query result does not change multiplicatively by more than the privacy budget when the entity's data is removed.

In various embodiments, an empirical approach is adopted to provide differential privacy. The approach involves applying a common statistical query to a set of databases (e.g., a time series of databases). Assuming that the data included in each database is substantially independent of the others, the set represents an empirical sample from a hypothesized probability distribution of databases. The approach produces an empirical sample of values of the statistical query from the set of databases, both with and without any particular entity's data. How the empirical probability distribution of the answers differs with and without any entity's data provides an empirical measure of differential privacy.

Example Data Analysis System

Figure 1:
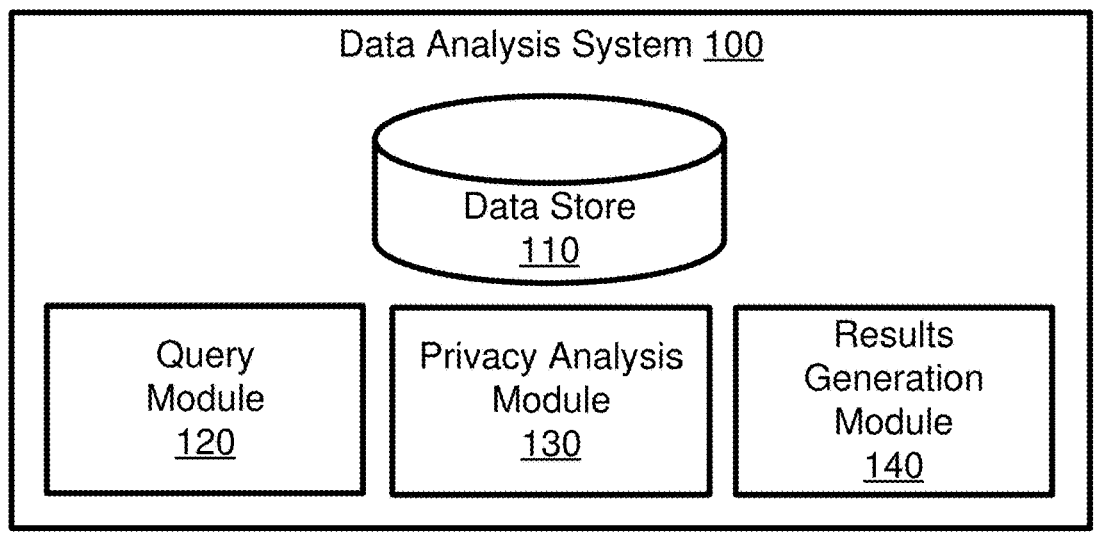
FIG. 1 is a block diagram of a data analysis system, according to one embodiment.

FIG. 1 illustrates one embodiment of a data analysis system 100. In the embodiment shown, the data analysis system 100 includes a data store 110, a query module 120, a privacy analysis module 130, and a results generation module 140. In other embodiments, the data analysis system 100 contains different or additional elements. In addition, the functions may be distributed among the elements in a different manner than described. For example, although the data store 110 is shown as part of the data analysis system 100, in some embodiments, the data is accessed remotely via a network.

Figure 2:
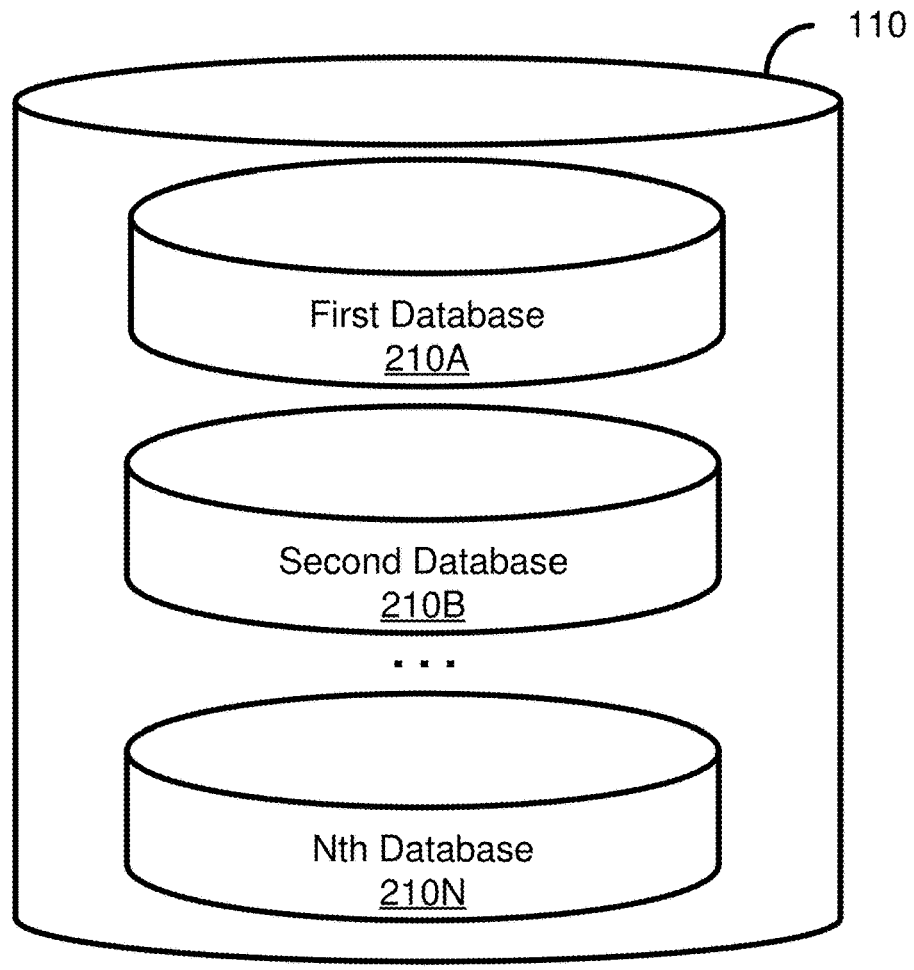
FIG. 2 is a block diagram of the data store of FIG. 1, according to one embodiment.

The data store 110 includes a set of databases that store data for which a statistical analysis that preserves individual privacy is desired. In some embodiments, each database of the set of databases includes data of a plurality of entities labeled by entity. FIG. 2 illustrates one embodiment of the data store 110 in greater detail. In the embodiment shown, the data store 110 includes a first database 210A, a second data base 210B, and an Nth database 210C. The databases 210A-N may be a time series of databases, such as the results of a daily or weekly data collection. One of skill in the art will recognize that the disclosed techniques can be used with any number of databases 210A-N. In various embodiments, the databases 210A-N are substantially independent, meaning that the data in one is not dependent on the data in another. Each database includes rows corresponding to individual entities (e.g., individuals, companies, or other legal persons). For example, the databases may include financial data of individual entities used to generate periodic market color reports.

Referring back to FIG. 1, the query module 120 is configured to receive a request to run a query on the set of databases. In an embodiment, the query module 120 provides a user interface (UI) with which a user may define statistical queries. In one embodiment, the UI enables the user to select a set of databases, provide one or more privacy parameters (e.g., what value is an acceptable amount by which a determined probability for a query changes if an entity is excluded), and define one or more statistical queries to run on the selected set of databases. The UI may be provided within a software package executing on the data analysis system 100 or accessed remotely from a client computing device, such as via a web interface or application program interface (API).

The privacy analysis module 130 determines whether the provided query or queries meets the defined differential privacy requirements. To determine whether the provided query or queries meets the defined differential privacy requirements, the privacy analysis module 130 may apply a common statistical query to a subset of databases, such as a time series of databases. In one embodiment, some or all of the subset of databases are subsets of a larger database. The subset of databases to be queried can be extracted by an operation that pulls out data meeting specified parameters. For example, a SELECT operation may be used to extract data for a specific day or week to generate a time series of databases from a database that includes data for a longer time period.

Assuming that the data included in each database of the set of databases are substantially independent of the data in the other databases, the set of databases represents an empirical sample from a hypothesized probability distribution of databases. In these embodiments, the privacy analysis module 130 produces an empirical sample of values of the statistical query from the set of databases, both with and without any particular entity's data. For example, privacy analysis module 130 may be configured to run a query on each of a subset of the databases by iteratively running the query with and without each entity's data to generate query results for the databases in the subset. The privacy analysis module 130 may be configured to calculate empirical probability density functions from the query results.

In one embodiment, the privacy analysis module 130 empirically estimates the probability density by sorting the sample answers to generate an empirical distribution function. The privacy analysis module 130 differences the cumulative distribution function across approximately (in asymptotic terms, up to a constant factor) the square root of the number of sample points to estimate the empirical density function. Other differencing widths may be used by those skilled in the art. For example, the differencing widths may depend on the number of sample points.

Figure 6:
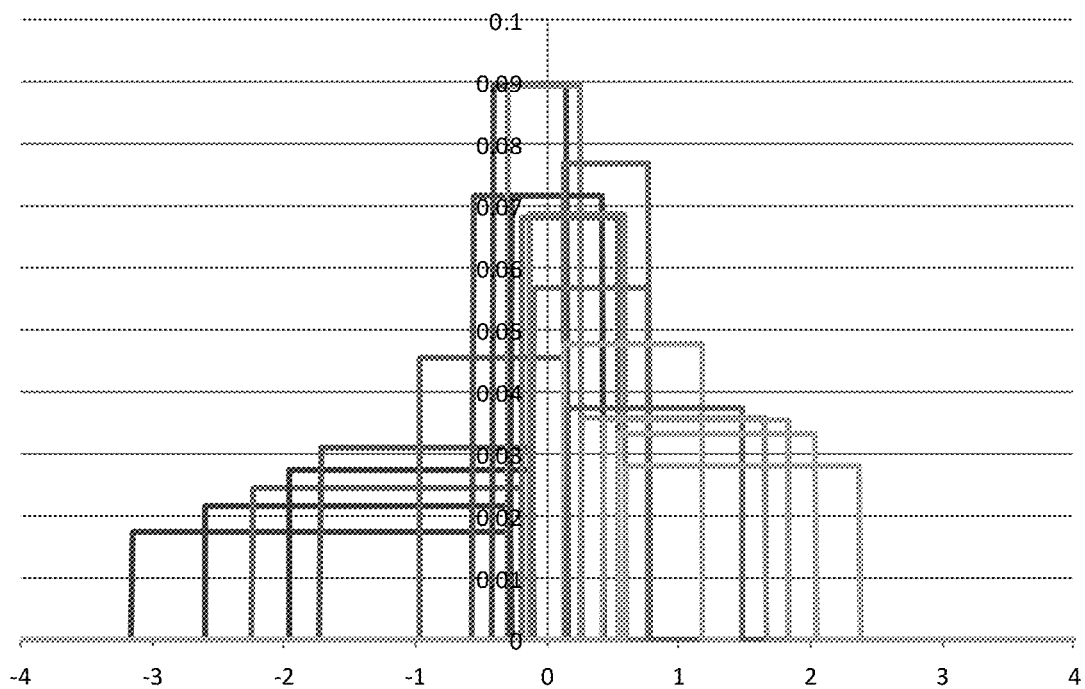
FIG. 6 illustrates an adaptive kernel, according to one embodiment.
Figure 7:
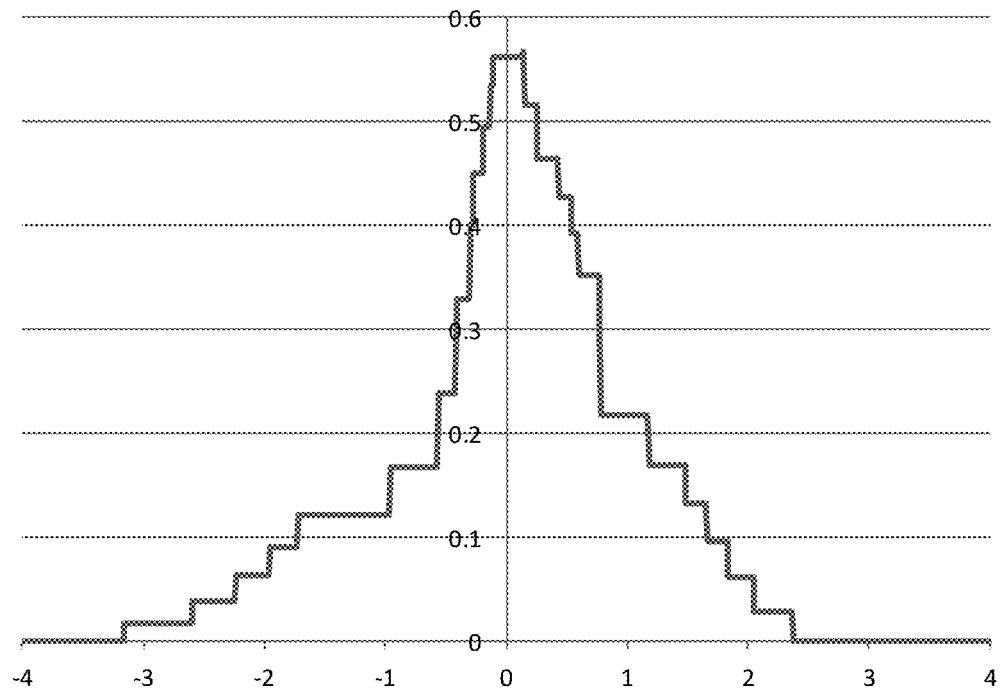
FIG. 7 illustrates an estimated empirical probability generated by summing the kernels of FIG. 6, according to one embodiment.

Alternatively, or additionally, the privacy analysis module 130 may empirically estimate the probability density using an adaptive kernel density estimation technique. Using this technique, the privacy analysis module 130 replaces each sample point with a kernel whose width is such that it spans approximately the square root of the number of sample points. The privacy analysis module 130 adds the kernels up, the sum of which is the density. Other adaptive kernel widths may be used by those skilled in the art. In addition, various kernel shapes may be used, including, but not limited to, rectangular, triangular, Gaussian, or the like. FIG. 6 shows an example of the adaptive kernels generated by a data sample. The kernels are narrower in the center of the distribution and wider in the tails. FIG. 7 shows the resulting estimated empirical probability density, which is the sum of the kernels.

Given the empirical density probability density, the privacy analysis module 130 may measure the differential privacy of the query as a function of two parameters, $\varepsilon$ and $\delta$. $\varepsilon$ defines the maximum acceptable amount by which the determined probability for a query changes if an entity is excluded. δ indicates the probability that the query does not meet the requirement defined by ε. In particular, a statistical query is empirically (ε, δ)-private if the empirical densities with and without any particular individual differ by a factor of no more than exp(ε), with the exception of a set on which the densities exceed that bound by a total of no more than δ. If p (x) is the probability density with the individual and $p_1(x)$ is the probability density without the individual, then the privacy requirement may be represented by Equation 1.

$$\delta \geq \max(\int (p(x)-\exp(\varepsilon)p_1(x))_+ dx, \int (p_1(x)-\exp(\varepsilon)p(x))_+ dx) \quad (1)$$

The δ in the privacy criterion, being a worst case, often overstates the potential loss of privacy. To address this, some embodiments use a metric of "total delta," Δ, which provides an estimate of the probability that some entity i will have their privacy compromised by more than ε. To define this, let $\delta_i$ be the minimal δ that works in the privacy criterion for entity i. The total delta may then be defined according to Equation 2.

$$\Delta = 1 - \Pi_i(1-\delta_i) \quad (2)$$

If the user provided more than one query, the privacy analysis module 130 may jointly analyze the queries for differential privacy compliance using corresponding multi-dimensional empirical probability densities. For example, the privacy analysis module 130 calculates two-dimensional empirical probability densities for two queries, three-dimensional empirical probability densities for three queries, etc.

A measurement of privacy may also be useful in adversarial situations, where the recipients of the statistical query results have partial information about the data in the databases. One example case is when the entities contributing to the database know what their own contributions to the database are and can also see the public result of the statistical query. In such adversarial cases, the privacy analysis module 130 may perform a similar empirical privacy analysis, except on empirical probability distributions conditional on the information known to the adversary. The privacy analysis module 130 constructs empirical conditional distributions by bucketing the information known to the adversary, and only contributing the result of the statistical query on a particular database to the conditional distribution corresponding to the bucket in which the information known to the adversary falls. Practically, the buckets can be chosen to be coarse enough that there are many data points contributing to each conditional distribution, but fine enough to compute accurate conditional distributions.

The above privacy guarantees are based on the assumption that each of the databases in an ordered sequence is an independent draw from a hypothetical probability distribution of databases. This is often true, or close to true, in many situations. However, this assumption may be empirically tested by measuring the empirical autocorrelation of the query results in the ordered sequence. If there is significant autocorrelation, then one solution is to locally aggregate the databases in the sequence to produce a shorter sequence of databases on a longer timescale where there is no significant autocorrelation in the query results. For example, autocorrelation may exist only a short-term horizon. If that is the case, daily data may be combined into weekly buckets, weekly data may be combined into monthly buckets, etc., such that there is no longer a significant degree of autocorrelation. Note that adding noise may not be a practical solution for autocorrelation, because the noise needed to effectively reduce autocorrelation is typically on the same order of magnitude as the query results themselves.

The results generation module 140 determines if and how to present the results of a query. In some embodiments, the results generation module 140 is configured determine whether the query meets one or more differential privacy requirements based on the empirical probability density functions and is further configured to output a result of the query responsive to determining that the query meets the one or more differential privacy requirements. In one such embodiment, if the privacy analysis module 130 determines the query meets the defined differential privacy requirements, the results generation module provides the results of the query for display to the user. The results may be displayed in any appropriate format, such as a chart, spreadsheet, list, or report. For example, the results generation module 140 may generate a report based on the query results and provide it for access by the user in a webpage, via email, or within a UI of the data analysis system 100.

If the query does not meet the defined differential privacy requirements, the results generation module 140 may add noise to the results (e.g., Gaussian or Laplacian noise). In one embodiment, the results generation module 140 may determine an amount of noise to add such that the results meet the defined differential privacy requirements. For example, the results generation module 140 may iteratively run a solver that tries different amounts of noise to determine an amount of noise to add that provides the desired privacy protection without excessively obscuring the underlying statistical information. The amount of noise added may be less than the amount of noise added in conventional differential privacy approaches. Thus, even when noise is added to provide improved privacy, more accurate statistical information may be returned by the query. Alternatively, if the differential privacy requirements are not met, the results generation module 140 may notify the user that the defined query could not be run.

Example Report Generation Method

Figure 3:
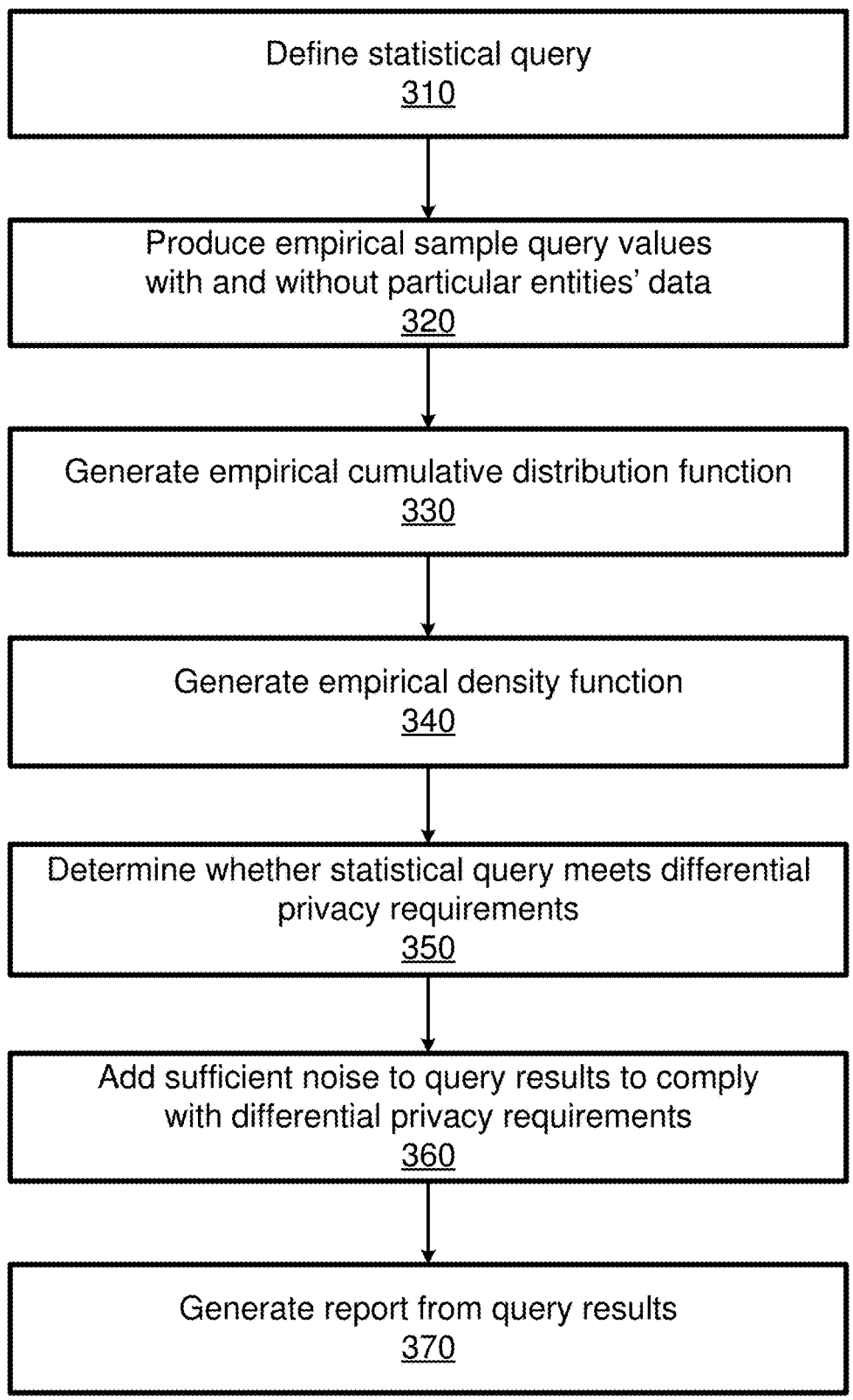
FIG. 3 is a flowchart of a method for generating a report based on a database query while retaining data privacy, according to one embodiment.

FIG. 3 illustrates an example method 300 for generating a report that meets differential privacy requirements. The steps of FIG. 3 are illustrated from the perspective of the data analysis system 100 performing the method 300. However, some or all of the steps may be performed by other entities or components. In addition, some embodiments may perform the steps in parallel, perform the steps in different orders, or perform different steps.

In the embodiment shown in FIG. 3, the method 300 begins with the data analysis system 100 defining 310 a statistical query (e.g., based on user input) to run against a set of databases in which rows correspond to entities. The data analysis system 100 produces 320 empirical sample query values by running the query against a sample of the set of databases, both with and without each entity's data. The data analysis system 100 may select a sample size that is large enough to give statistically significant results, but small enough to be relevant (for example, if the sequence of databases is a time series, then sampling more recent databases has greater relevance). From the sample query values, the data analysis system 100 generates 330 an empirical cumulative distribution function from which it can generate 340 an empirical density function (e.g., by differencing across approximately the square root of the number of sample points).

The data analysis system 100 determines 350 whether the statistical query meets the applicable differential privacy requirements based on the empirical density function. For example, as described previously, a statistical query may be considered empirically ($\varepsilon,\delta$)-private if the empirical densities with and without any particular individual differ by a factor of no more than exp($\varepsilon$), with the exception of a set on which the densities exceed that bound by a total of no more than $\delta$.

If the statistic query does not meet the applicable differential privacy requirements, the data analysis system 100 may add 360 sufficient noise to make the query differential privacy compliant. For example, the data analysis system 100 may add Gaussian or Laplacian noise to obfuscate the individual row data at the cost of making the resulting statistical information returned by the query less precise. Regardless of whether noise was added 360 or not, the data analysis system 100 may generate 370 a report based on the query results. The report may be presented to one or more users via any appropriate interface.

Figure 4:
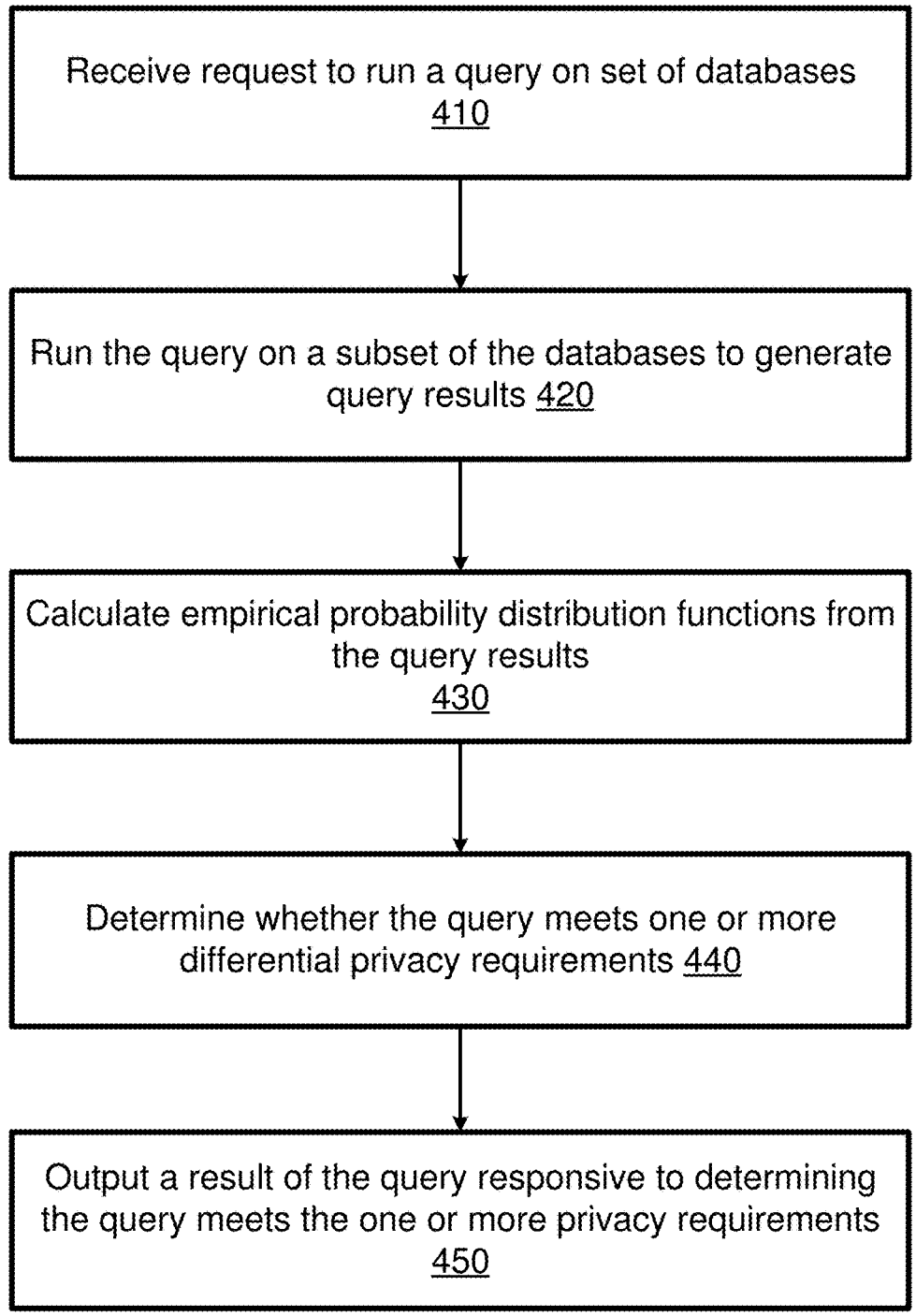
FIG. 4 is a flowchart of a method for outputting a result of a database query while retaining data privacy, according to one embodiment.

FIG. 4 illustrates an example method 400 for outputting a result of a database query while retaining data privacy. The steps of FIG. 4 are illustrated from the perspective of the data analysis system 100 performing the method 400. However, some or all of the steps may be performed by other entities or components. In addition, some embodiments may perform the steps in parallel, perform the steps in different orders, or perform different steps.

In the embodiment shown in FIG. 4, the method 400 includes receiving 410 a request to run a query on a set of databases. Each database in the set of databases includes data of entities, and the data is labeled by entity. The method 400 further includes running 420 the query on a subset of the databases by iteratively running the query with and without each entity's data to generate query results for the databases in the subset.

Empirical probability density functions are calculated 430 from the query results. In some embodiments, the empirical probability density functions are calculated 430 by sorting the query results to create empirical cumulative distribution functions of the query results with and without each of the entities. The empirical cumulative distribution functions are differenced using a spacing of a number of data points depending on the data of the data to yield the empirical probability density functions. For example, the spacing may be approximately the square root of a total number of data points in the data set.

Alternatively, or additionally, the empirical probability density functions may be calculated 430 by determining an adaptive kernel density estimation. In these embodiments, the data points are replaced by kernels whose widths are selected to span a number of data points, and the kernels are adding to calculate the density. The number of data points may depend on the set of the data set. For example, the width of the kernel is such that is spans approximately the square root of a total number of data points in the set. The shape of the kernel may vary. For example, the kernel may be rectangular, triangular, Gaussian, or the like. Further, if there is some information in the databases known, or potential known, to an adversary, the empirical probability density may be calculated conditional on that adversarial information falling into a series of buckets.

The method 400 further includes determining 440 whether the query meets one or more differential privacy requirements based on the empirical probability density functions. In some embodiments, determining the query meets the one or more privacy requirements includes calculating a total amount, $\delta$, by which the probability densities with and without each entity's data exceed a bound of differing by no more than a factor of exp ($\varepsilon$), where $\varepsilon$ is a parameter indicating a maximum acceptable change in the determined probability for a query if an entity is excluded.

Responsive to determining that the query meets the one or more differential privacy requirements, a result of the query is outputted 450. In some embodiments, determining that the query meets the one or more differential privacy requirements comprises calculating a total delta, $\Delta$, which is defined as the accumulation $\Delta=\Pi_i(1-\delta_i)$ over entities i, where $\delta_i$ is a minimal $\delta$ that works in a privacy criterion for entity i.

Responsive to determining the query does not meet the one or more differential privacy requirements, noise may be added to the query results until the query results do meet the one or more differential privacy requirements. The outputted result may be based on the results with the added noise. In some embodiments, the noise is Gaussian noise, Laplacian noise, or the like.

In some embodiments, the set of databases is an ordered sequence. In these embodiments, responsive to empirical evidence that indicates the query results in the sequences are not statistically independent and have statistically significant autocorrelation, the sequence of databases may be locally aggregated into a shorter sequence of larger databases until the query results no longer have statistically significant autocorrelation. The differential privacy requirements may then be tested based on the shorter sequence of larger databases.

Example Computing Device Architecture

Figure 5:
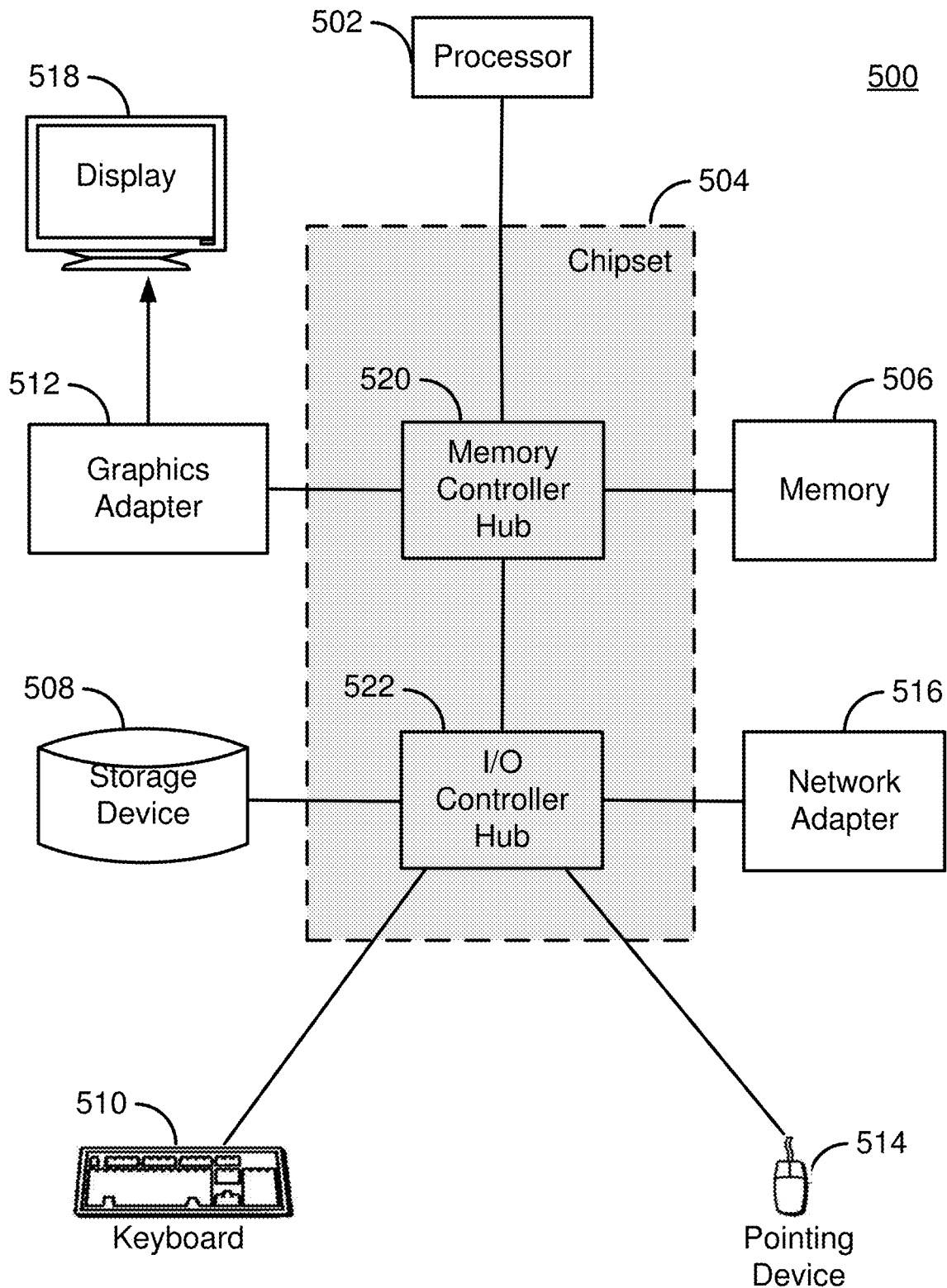
FIG. 5 is a block diagram illustrating an example computer suitable for use as the data analysis system of FIG. 1, according to one embodiment.

FIG. 5 illustrates an example computer 500 suitable for use as a data analysis system 100. The example computer 500 includes at least one processor 502 coupled to a chipset 504. For clarity, operations may be described as being performed by "a processor," but this should be understood to include multiple processors working cooperatively to perform the recited operations. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable medium and/or non-transitory computer-readable storage medium such as a hard drive, compact disk read-only memory (CD-ROM), DVD, or solid-state memory device. The memory 506 holds instructions and data used by the processor 502. While the storage device 508 is shown to be a single medium, the term "machine-readable medium" should be taken to include a single medium or multiple media (e.g., a centralized or distributed database, or associated caches and servers) configured to store data or software used by the computer 500. For example, the data store 110 may be a distributed database provided by multiple servers and accessed by the data analysis system 100 via a network.

The pointing device 514 is a mouse, track ball, touch-screen, or other type of pointing device, and is used in combination with the keyboard 510 (which may be an on-screen keyboard) to input data into the computer system 500. The graphics adapter 512 causes the display 518 to display images and other information. The network adapter 516 couples the data analysis system 100 to one or more computer networks, such as the internet. In some embodiments, a computer can lack some of the components described above, such as a keyboard 510, pointing device 514, or display 518.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate alternative structural and functional designs for a system and a process for managing a pension plan. For instance, server processes may be implemented using a single server or multiple servers working in combination, databases and applications may be implemented on a single system or distributed across multiple systems, and distributed components may operate sequentially or in parallel. Thus, while particular embodiments and applications have been illustrated and described, the scope of protection should be limited only by the following claims.

What is claimed is:

1. A method comprising:
receiving, by a data analysis system, a request from a user to run a query on a set of databases, each database in the set of databases including data of a plurality of entities, the data labelled by entity;
running, by the data analysis system, a plurality of sample queries based on the query requested by the user to generate sample query results for the databases in the subset, each of the sample queries having a different entity's data removed relative to other sample queries in the plurality;
calculating, by the data analysis system, empirical probability density functions from the sample query results;
determining, by the data analysis system, whether the query requested by the user meets one or more differential privacy requirements based on the empirical probability density functions; and
outputting, by the data analysis system, a result of the query requested by the user to the user responsive to determining that the query requested by the user meets the one or more differential privacy requirements, wherein calculating the empirical probability density functions comprises:
sorting the sample query results to create empirical cumulative distribution functions of the sample query results with and without each of the plurality of entities; and
differencing the empirical cumulative distribution functions using a spacing of a number of data points depending on a size of the data to yield the empirical probability density functions.

2. The method of claim 1, wherein determining whether the query requested by the user meets one or more differential privacy requirements comprises calculating a total amount, $\delta$, by which probability densities with and without each entity's data exceed a bound of differing by no more than a factor of $\exp(\varepsilon)$, where $\varepsilon$ is a parameter indicating a maximum acceptable change in the determined probability for a query if an entity is excluded.

3. The method of claim 1, wherein the spacing is approximately a square root of a total number of data points in the data set.

4. The method of claim 1, wherein calculating the empirical probability density function comprises:
determining an adaptive kernel density estimation, wherein data points are replaced by kernels whose widths are selected to span a number of data points, the number of data points depending on a size of the data set; and
adding the kernels to calculate the density.

5. The method of claim 4, wherein the width of the adaptive kernel is such that it spans approximately a square root of a total number of data points in the data set.

6. The method of claim 4, wherein the kernel shape is rectangular, triangular, or Gaussian.

7. The method of claim 1, further comprising, responsive to determining the query requested by the user does not meet the one or more differential privacy requirements, adding noise to the query results until the query results do meet the one or more differential privacy requirements.

8. The method of claim 7, wherein the noise is Gaussian noise or Laplacian noise.

9. The method of claim 7, wherein the result outputted is based on the results with added noise.

10. The method of claim 1, wherein there is some information in the databases that may be known to an adversary, and the empirical probability density is calculated conditional on that adversarial information falling into a series of buckets.

11. The method of claim 1, wherein the set of databases is an ordered sequence, and, responsive to empirical evidence indicating that the query results in the sequence have statistically significant autocorrelation, the method further comprises:

locally aggregating the sequence of databases into a shorter sequence of larger databases, until the query results no longer have statistically significant autocorrelation; and testing the differential privacy requirements based on the shorter sequence of larger databases.

12. The method of claim 1, wherein determining whether the query meets one or more differential privacy requirements comprises calculating a "total delta" $\Delta$, which is defined as the accumulation $\Delta=1-\Pi_i(1-\delta_i)$ over entities, where $\delta_i$ is a minimal $\delta$ that works in a privacy criterion for entity i.

13. A non-transitory computer-readable storage medium containing computer program code comprising instructions that, when executed by a processor, causes the processor to:
   receive a request to run a query requested by a user on a set of databases, each database in the set of databases including data of a plurality of entities, the data labelled by entity;
   run a plurality of sample queries based on the query requested by the user to generate sample query results for the databases in the subset, each of the sample queries having a different entity's data removed relative to other sample queries in the plurality;
   calculate empirical probability density functions from the sample query results;
   determine whether the query requested by the user meets one or more differential privacy requirements based on the empirical probability density functions; and
   output a result of the query requested by the user to the user responsive to determining that the query requested by the user meets the one or more differential privacy requirements, wherein calculating the empirical probability density function comprises:
   determining an adaptive kernel density estimation, wherein data points are replaced by kernels whose widths are selected to span approximately tho a square root of a total number of data points in the data set; and
   adding the kernels to calculate the density.

14. The non-transitory computer-readable storage medium of claim 13, wherein calculating the empirical probability density functions comprises:
   sorting the sample query results to create empirical cumulative distribution functions of the sample query results with and without each of the plurality of entities; and
   differencing the empirical cumulative distribution functions using a spacing of a number of data points depending on a size of the data to yield the empirical probability density functions.

15. The non-transitory computer-readable storage medium of claim 13, wherein the set of databases is an ordered sequence, and, responsive to empirical evidence indicating that the query results in the sequence have statistically significant autocorrelation, wherein the computer program code further comprises instructions that, when executed by the processor, causes the processor to:
   locally aggregate the sequence of databases into a shorter sequence of larger databases, until the query results no longer have statistically significant autocorrelation; and
   test the differential privacy requirements based on the shorter sequence of larger databases.

16. The non-transitory computer-readable storage medium of claim 13, wherein there is some information in the databases that may be known to an adversary, and the empirical probability density is calculated conditional on that adversarial information falling into a series of buckets.

17. The non-transitory computer-readable storage medium of claim 13, wherein the computer program code further comprises instructions that, when executed by the processor, causes the processor to:
   responsive to determining the query requested by the user does not meet the one or more differential privacy requirements, adding noise to the query results until the query results do meet the one or more differential privacy requirements.

18. A data analysis system comprising:
one or more processors configured to execute instructions;
a set of databases, each database in the set of databases including data of a plurality of entities, the data labeled by entity;
a memory comprising instructions executable by the one or more processors, the memory comprising:
   a query module configured to receive a request from a user to run a query on the set of databases;
   a privacy analysis module configured to run a plurality of sample queries based on the query requested by the user to generate sample query results for the databases in the subset, each of the sample queries having a different entity's data removed relative to other sample queries in the plurality, and further configured to calculate empirical probability density functions from the sample query results, wherein calculating the empirical probability density function comprises:
   determining an adaptive kernel density estimation, wherein data points are replaced by kernels whose widths are selected to span approximately tho a square root of a total number of data points in the data set; and
   adding the kernels to calculate the density; and
   a results generation module configured to determine whether the query requested by the user meets one or more differential privacy requirements based on the empirical probability density functions, wherein the results generation module is further configured to output a result of the query requested by the user to the user responsive to determining that the query meets the one or more differential privacy requirements.

* * * * *

UNITED STATES PATENT AND TRADEMARK OFFICE
CERTIFICATE OF CORRECTION

PATENT NO. : 11,593,360 B2  
APPLICATION NO. : 17/006061  
DATED : February 28, 2023  
INVENTOR(S) : Burchard et al.

It is certified that error appears in the above-identified patent and that said Letters Patent is hereby corrected as shown below:

In the Claims

In Column 11, in Claim 13, Line 37, delete "tho a" and insert -- a --, therefor.

In Column 12, in Claim 18, Line 43, delete "tho a" and insert -- a --, therefor.

Signed and Sealed this
Fifteenth Day of August, 2023

Katherine Kelly Vidal
*Director of the United States Patent and Trademark Office*